March 12, 1957  W. BLACKWOOD  2,784,998
RESILIENT CAR WHEEL AXLE ASSEMBLIES
Filed April 16, 1954
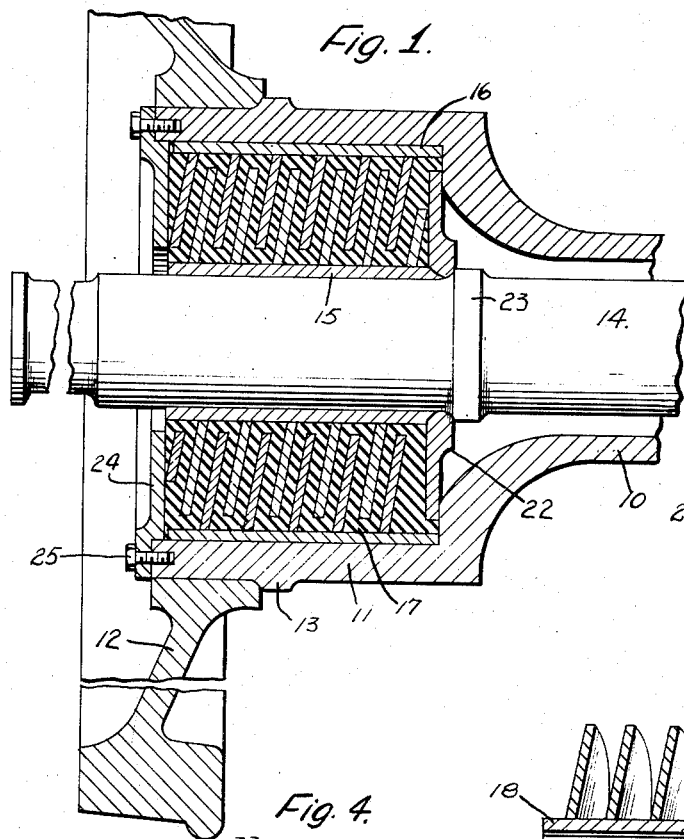
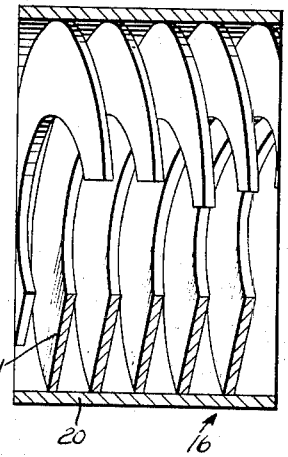
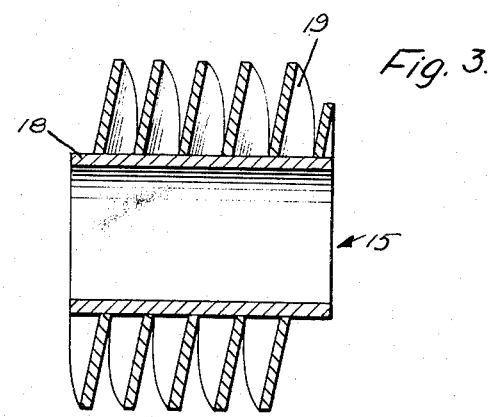
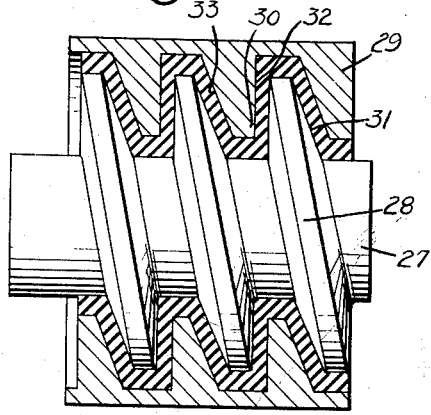
Waves Blackwood
INVENTOR United States Patent Office 2,784,998
Patented Mar. 12, 1957

2,784,998
RESILIENT CAR WHEEL AXLE ASSEMBLIES
Waves Blackwood, Los Angeles, Calif.
Application April 16, 1954, Serial No. 423,814
3 Claims. (Cl. 295—43)

This invention relates to a resilient car wheel axle assembly.

It is an object of the invention to provide a simple resilient axle wheel assembly for railway car wheels and trucks which is easily assembled and disassembled and wherein the wheels will be held locked in such a manner as to be held rigidly in their operating plane.

It is another object of the invention to provide a resilient car wheel axle assembly wherein the mating parts are of helical shape and are joined by resilient material which is retained against axial expansion by rigid end plates secured to the axle and to the wheel sleeve respectively.

It is another object of the invention to provide a resilient car wheel axle assembly which is so designed that while the assembly is at rest, the resilient bonding material will be under tension, compression and shear throughout the length of the resilient assembly and when the wheel is in rotation upon the axle, the inner member is designed to float within the outer member and under normal running conditions the resilient bonding material is placed under axial compression and such that it offers greater resistance to shock and vibration under heavy load stresses.

Other objects of the invention are to provide a resilient car wheel axle assembly having the above objects in mind and comprising helical mating elements with resilient bonding material therebetween which is of simple construction, inexpensive to manufacture, has a minimum number of parts, rugged, durable, has long life, compact, efficient and effective in operation.

For a better understanding of the invention, reference may be had to the following detailed description taken in connection with the accompanying drawing, in which:

Figure 1 is an enlarged fragmentary sectional view of the wheel axle assembly constructed according to one form of the invention;

Fig. 2 is a vertical sectional view of the external helical element forming a part of the assembly;

Fig. 3 is a vertical sectional view of the internal helical element adapted to mate with the external helical element and also forming a part of the assembly;

Fig. 4 is a vertical sectional view of a modified form of the invention wherein the external and internal elements conform in shape to standard threads with the threads of one of the elements being made of undersize to accommodate between the threads the resilient bonding material.

Referring now particularly to Figs. 1, 2 and 3, the car wheel axle assembly is shown as comprising generally an axle sleeve 10 having enlarged open hollow end 11 to which a car wheel 12 is tightly fitted and brought to bear against annular flange or rib 13 on the external periphery of the enlarged portion 11.

Extending through the axle sleeve 10 is a solid supporting axle 14.

Within the enlargement 11 are disposed internal and external helical mating members 15 and 16 maintained with portions thereof in spaced relationship from one another by resilient bonding material indicated at 17.

The internal mating member 15 comprises a hollow sleeve portion 18 having a wide helix coil 19 welded at its inner periphery to the outer surface of the sleeve 18, so that the turns of the helix are retained in axially spaced relationship with respect to each other.

The external mating member 16 is formed of a cylindrical sleeve 20 and a helix 21 having its outer peripheral edge welded to the inner face of the sleeve 20.

The internal member in the assembly of the parts is fitted into the external member by threading action and the parts are secured together by the vulcanization of the bonding material 17.

An end plate 22 is disposed on the axle 14 and against an annular flange 23. The assembly will be retained within the enlargement 11 by end plate 24 fixed to the end of the enlargement by fastening screws 25. The bonding material is vulcanized to the parts and any movement of one part will be accommodated by the resilient material without the movement being imparted to the other part. The sleeve 20 is welded to the end plate 24 and the sleeve 18 is welded at suitable locations or points to the solid axle 14. There are, of course, many suitable means for mounting the sleeve 18 on the axle 14 and the sleeve 20 within the enlarged portion 11.

It will be apparent that the resilient material in cooperation with the internal and external mating elements will yieldably resist shock and will have the requisite shock absorbing characteristics. It will be further seen that the parts are easy to mount in the assembly and that the resilient material will be distorted in shear and compression and resist both radial and horizontal movement of the parts relative to one another. If the outer member is caused to be rotated clockwise and the load of resistance applied to the internal element, a torque resistance opposing the direction of rotation of the one element relative to the other will be established and the resilient material will be placed under compression along the axis of the element.

This is particularly true with the form of the invention shown in Fig. 4 employing standard threads. In this form of the invention the internal member as indicated at 27 has helical threads 28 thereon. An external element 29 has internal threads 30 which are joined to the threads 28 of the internal part by resilient material 31 vulcanized between the parts in the manner as set forth and to provide a solid unit. The resilient material, upon rotation of one part relative to the other will be compressed along the axis of the threads around their entire surfaces and all parts will be placed under the same stress. The side thrust action causes the resilient material to be placed under automatic torque control compression and will cause the resilient material to offer greater resistance to shock and vibration under heavy load stresses.

The helical thread 28 on the element 27 is of symmetrical shape in section, whereas the helical thread 30 in the element 29 is of non-symmetrical shape. In this manner, the material disposed between threads can be maintained of equal thickness and spacing therebetween. The thread 30 has a side 32 lying in a radial plane and a side 33 lying in a plane inclined to the radial plane, the radial plane running normal to the longitudinal axis.

While various changes may be made in the detail construction, it shall be understood that such changes shall be within the spirit and scope of the present invention as defined by the appended claims.

What is claimed is:

1. A resilient car wheel axle assembly comprising a hollow sleeve axle, a solid wheel axle, a resilient unit disposed therebetween, said resilient unit comprising an external element having an internal helical portion, an internal element having a mating external helical portion, said portions being spaced from one another on said elements being mated together, and resilient bonding material disposed between the helical portions to absorb shock and vibration movements tending to be transmitted between the elements, said wheel axle having an enlargement accommodating said resilient unit, said solid axle having an annular flange, a retaining plate engaging with the annular flange and disposed internally of the hollow sleeve axle to hold the unit against inward axial displacement upon the hollow sleeve axle, and a retaining plate secured to the end of the enlargement and fixed to the enlargement to hold the unit therewithin.

2. A resilient car wheel axle assembly according to claim 1, including a wheel fixedly mounted upon the outer end of the external periphery of said enlargement, said enlargement having an annular flange abutting the inner end of said wheel.

3. A resilient car wheel axle assembly according to claim 1, said resilient bonding material comprising vulcanized rubber.

References Cited in the file of this patent

UNITED STATES PATENTS

| | | |
|---|---|---|
| 101,187 | Truesdell | Mar. 22, 1870 |
| 2,092,613 | Olley | Sept. 7, 1937 |
| 2,231,037 | Taylor | Feb. 11, 1941 |
| 2,533,176 | Oelkers | Dec. 5, 1950 |